Inventors
LEONARD SINCLAIR HODGES &
ROBERT BUCHANAN ANNAT
By
Tweedale & Gerhardt
Attorneys United States Patent Office 3,347,560
Patented Oct. 17, 1967

3,347,560
SWINGING BOOM PRESSURE CONTROL HITCH
Leonard S. Hodges, Leamington, and Robert B. Annat, Kenilworth, England, assignors to Massey-Ferguson Services N.V., Curacao, Netherlands Antilles
Filed Sept. 20, 1965, Ser. No. 488,474
Claims priority, application Great Britain, Sept. 25, 1964, 39,101/64
13 Claims. (Cl. 280—405)

ABSTRACT OF THE DISCLOSURE

A pressure control hitch for transferring weight between trailed implements and the tractor rear wheels including a swinging boom supported on a yoke secured to the draft links of a three-point tractor hitch. The end of the boom is connected by a flexible tension member with the tongue of the implement for exerting an upward force on the implement to transfer weight to the tractor. The boom is mounted on an inclined axis such that the tension between the boom and implement is relieved during turns.

---

This invention relates generally to hitch mechanisms for connecting implements and the like to tractors, and is particularly concerned with a hitch arrangement for connecting independently supported implements or trailers to a tractor having a power lift mechanism wherein a portion of the implement weight may be transferred to the tractor rear wheels.

It has become conventional to control the operation of earthworking implements changing the position of the implement relative to the tractor to which it is attached in accordance with variations in one or more variable conditions such as working depth, draft forces, or pressure in the tractor hydraulic system. Such control is accomplished by tractors having power lift systems in which a pair of trailing or rearwardly extending draft links are hydraulically raised and lowered with respect to the tractor in accordance with variations in the loads or forces on the draft links. The weight, and other vertical forces acting on the implement are transferred to the tractor rear wheels through the hitch linkage to increase traction. However, when a major portion of the implement weight is carried on gauge wheels, the weight transferred to the tractor wheels is limited and primarily is dependent upon large soil reaction or suction forces being present to react on the tractor hitch. In certain independently supported pull-type implements or other trailed vehicles such as planters, there are little or no soil reaction forces available for weight transfer.

It is therefore an object of this invention to provide a hitch mechanism for attachment to the tractor draft links by means of which constant weight transfer can be obtained when a pull-type implement or other trailed vehicle having independent ground support means is attached to the tractor.

A further object is to provide a weight transfer hitch for attaching a pull-type implement or other independently supported trailed vehicle to a tractor wherein the weight transfer is constant when the implement is pulled in a straight line, but is reduced during turns to eliminate the possibility of overturning the tractor.

Still another object is to provide a weight transfer hitch for independently supported implements for trailers which will not inhibit maneuverability of the tractor-trailer combination, and wherein the weight transfer is constant except during turns to reduce the overturning forces on the tractor.

An additional object lies in the provision of a weight transfer hitch arrangement for connecting independently supported implements or trailers to a tractor which will permit maximum maneuverability of the tractor relative to the trailer, and in which excessive forces on the tractor are prevented by an overload release mechanism.

In carrying out the foregoing, and other objects, a support in the form of a U-shaped yoke member is mounted on the draft links of the tractor with the legs of the U-shaped yoke extending rearwardly toward the free end of the draft links. Mounted on the cross piece of the U-shaped yoke member is a rearwardly extending boom which is swingable from side to side with respect to the tractor longitudinal axis.

When a trailed vehicle is connected with the tractor drawbar, the free end of the boom is connected with the implement tongue by a flexible connection to exert a lifting force on the implement when a raising force is applied to the draft links by the power lift. The boom swings about an axis which is inclined upwardly and forwardly such that the free end of the boom moves downwardly toward the implement tongue during turns to reduce the force acting on the tractor through the boom. In the event that the implement tongue separates from the tractor drawbar, overload release means is provided to cause separation of the flexible tension member from the boom.

Other objects, advantages and features of the invention will become apparent from the following description taken in connection with the accompanying drawings in which.

Figure 1:
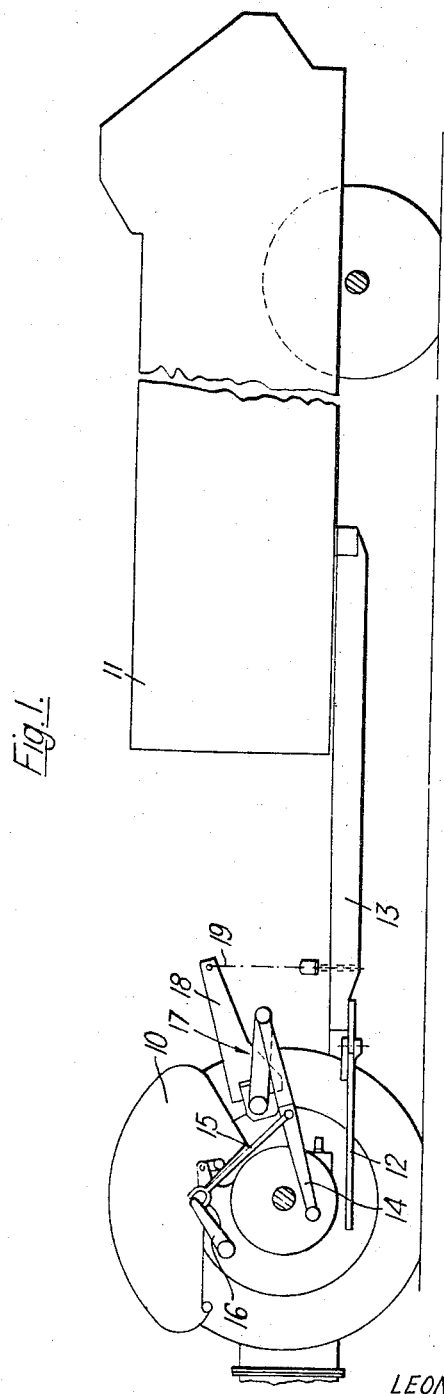
FIG. 1 is a fragmentary diagrammatic side elevation of a tractor coupled to a wheeled vehicle.

Referring to the drawings, FIG. 1 shows a tractor 10 coupled to a vehicle 11 by means of a drawbar 12 rigidly connected to the tractor and pivotally connected to a tongue or drawbar 13 rigid with the vehicle. The tractor includes the usual spaced lower draft links 14 and drop links 15 by means of which the draft links can be raised and lowered through lift arms 16 connected to a ram forming part of the tractor hydraulic system. A tractor hitch 17 including a swingable boom 18 is mounted on the draft links 14 and a flexible tension member in the form of a chain 19 extends from the rear end of the boom around the drawbar 13 of the vehicle.

Figure 2:
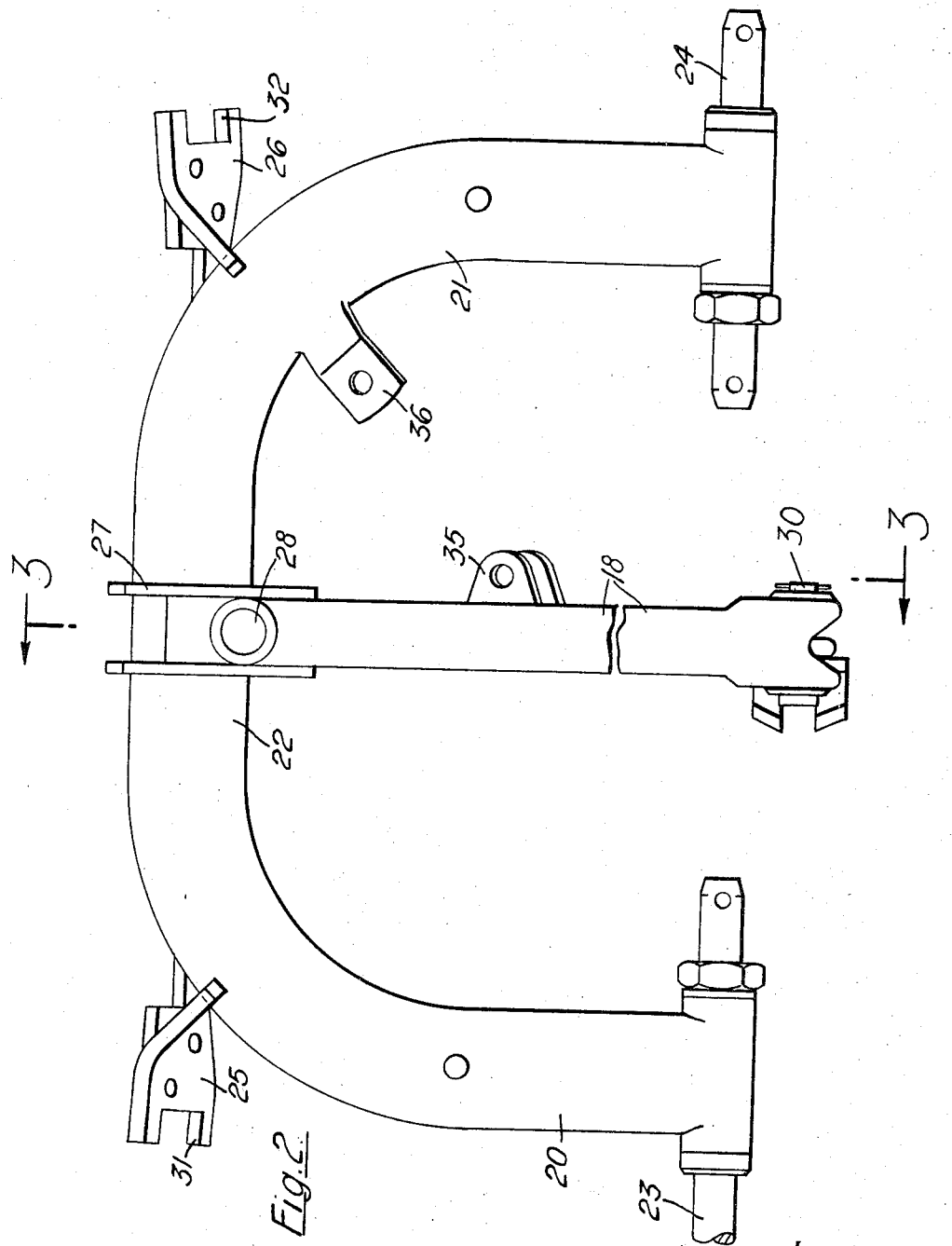
FIG. 2 is a plan view of a tractor hitch according to the invention.

Referring to FIG. 2, the tractor hitch consists of a substantially U-shaped support in the form of a yoke having side legs 20 and 21 connected by a cross piece 22 forming the base of the U. The free ends of the legs 20 and 21 are provided with pins 23 and 24, respectively, for connection to the draft links 14. Brackets 25 and 26 are provided on the legs 20 and 21 respectively, adjacent the cross piece 22 for engagement with the draft links at two points spaced rearwardly from the pins 23 and 24. The pins 23 and 24 and brackets 25 and 26 mount the yoke rigidly on the draft links 14.

Figure 3:
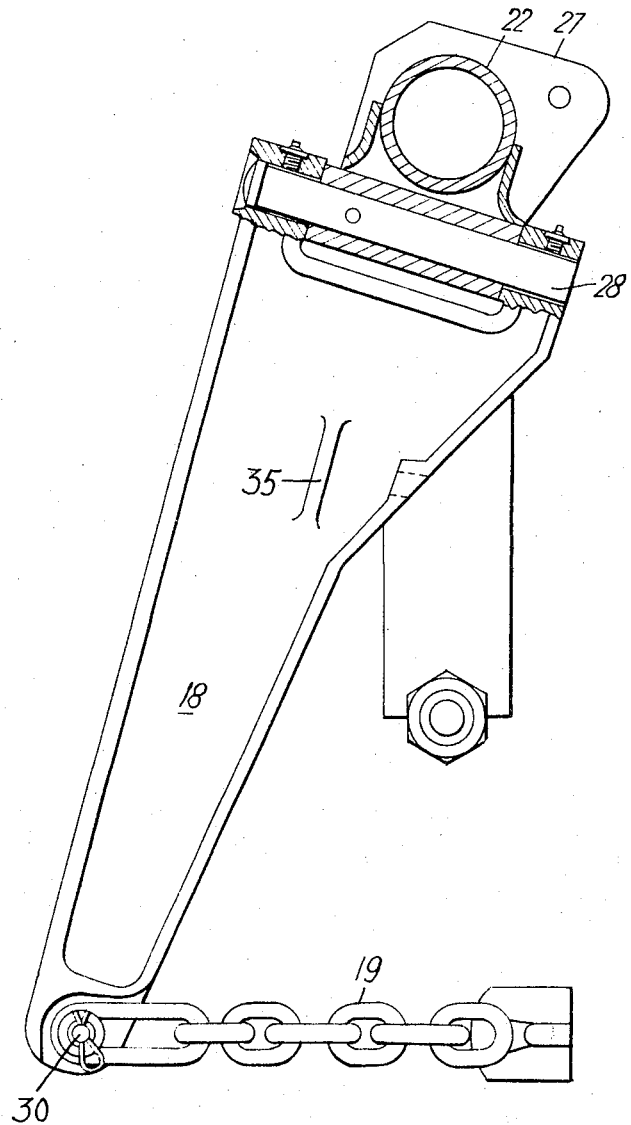
FIG. 3 is a section on line 3—3 of FIG. 2.

A bracket 27 is mounted centrally on the cross piece 22 and carries an upright pivot pin 28. The boom 18 is pivotally mounted on the pin 28 for free swinging movement from side to side. As best seen in FIG. 3 the chain 19 is connected to the outer end of the boom 18 by a pivot pin 30, the free end of the chain being attached to the tongue 13 of the implement.

The tractor hitch is most useful when used in combination with a tractor fitted with automatic pressure control by virtue of which weight transfer from the vehicle to the tractor is automatically maintained constant. In operation, if the vehicle falls relatively to the tractor resulting in a downward pull on the chain 19, the boom 18 and the yoke are pulled downwards resulting in a downward load on the draft links 14. This results, through the drop links 15 and lift arms 16, in an increase in pressure in the ram which is sensed by the automatic pressure control system which then exhausts fluid from the ram until the pressure returns to its original value. This results in downward movement of the draft links 14 and boom 18 so that the tension in the chain 19 is reduced and the weight transferred from the vehicle to the tractor is restored to its initial value.

Similarly, if the vehicle rises relatively to the tractor the drawbar 13 will rise, thus removing the load from the chain 19. This reduces the pressure in the ram and the pressure control system causes fluid to be supplied to the ram thus raising the draft links 14 and hitch 17 until the chain tension is restored to its original value.

By virtue of the pivotal mounting of the boom 18 this automatic pressure control may take place when the tractor and vehicle are not in line, such as when turning a corner.

The pivot pin 28 is inclined forwards from bottom to top and hence the boom 18 is inclined slightly upwards from front to rear. Because of this, when turning a corner the rear end of the boom falls slightly which is equivalent to raising of the implement relative to the tractor. Hence the draft links rise to take up the slack in the chain. However, the geometry may be arranged such that when the boom is tilted to one side to its furthest extent, the draft links reach transport position without taking up the slack in the chain. There is, therefore, no weight transfer in this extreme articulated position. Presence of weight transfer in such a position would be dangerous since the implement would tend to topple the tractor over sideways.

Figure 4:
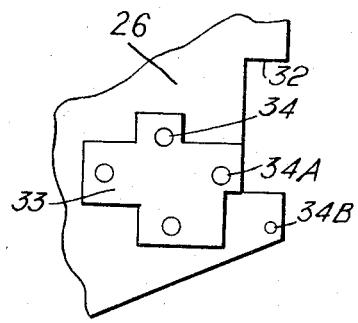
FIG. 4 is a fragmentary view of a detail.

The brackets 25 and 26 include recesses 31 and 32, respectively, adapted to snugly engage the drift links 14. However, the draft links on various tractors have different dimensions and the distance between them varies. To accommodate this and ensure that the recesses 31 and 32 fit snugly on the links, adjustable plates 33 are provided which may be turned into any one of four positions to vary the dimensions of the recesses 31 and 32. In FIG. 4 one such plate 38 is shown in a stowed position in which the dimensions of the recess 32 are unaltered, the plate 33 being held in position by bolts 34 and 34a. To adjust the size of the recess the plate 33 is removed and appropriate two of the holes placed over the hole for the bolt 34a, and a hole 34b. The plate is then bolted in its new position on the bracket 26.

The boom 18 includes sideways depending lugs 35 engageable with cooperating lugs 36 on the yoke to secure the boom to the yoke when not in use. A pin (not shown) is inserted through holes in the lugs for this purpose.

Figures 5, 6:
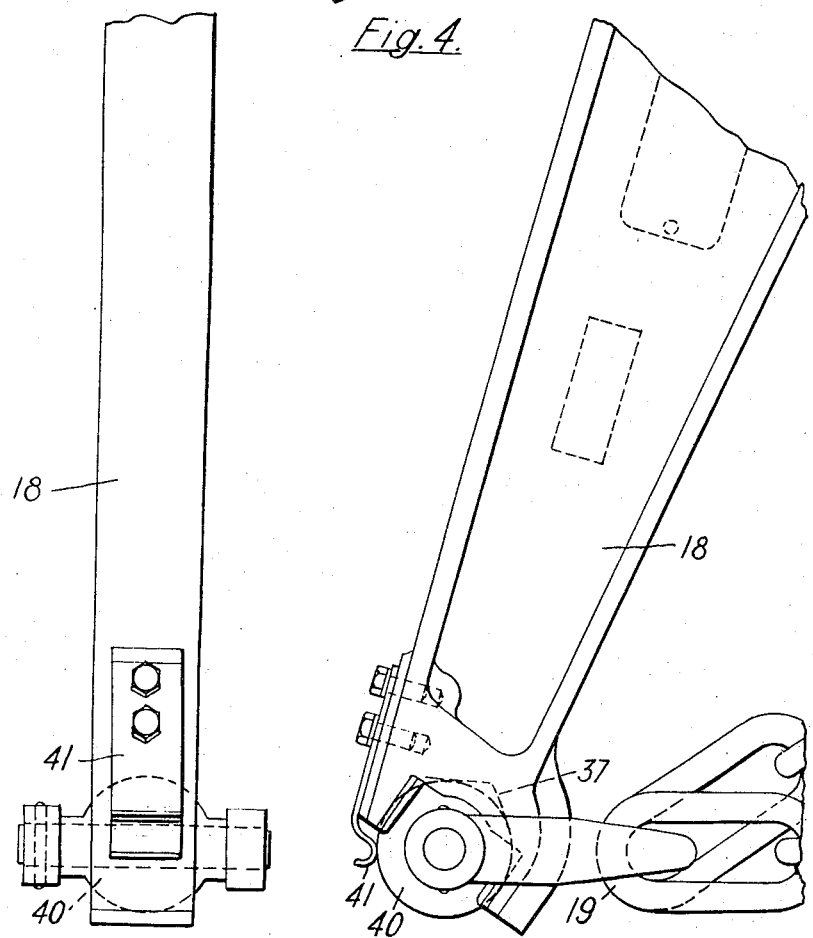
FIGS. 5 and 6 are plan and elevational views of a modification of the tractor hitch.

In a modification, shown in FIGS. 5 and 6 the chain 19 is releasably attached to the boom 18 by overload release means comprising a ball 40 which fits into a recess 37 in the end of the boom and is held in the recess during normal operation by a spring 41. If the connection between the drawbars 12 and 13 breaks, the weight of the vehicle acting on the chain 19 tends to tip the tractor over rearwards. However, such rearward tipping movement of the tractor and/or the inclination of the chain due to the tractor and vehicle moving apart, results in the ball 40 forcing the spring 41 clear of the recess so that the chain 19 slips out of the recess, thus disconnecting the vehicle completely from the tractor and allowing the tractor front wheels to fall back to the ground.

Figure 7:
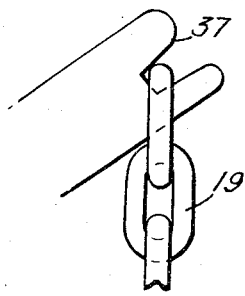
FIG. 7 is a diagrammatic side elevation of a further modification.

In the modification shown in FIG. 7, the chain is directly slidably accommodated in the recess 37. When the chain reaches a predetermined angle it slips out of the recess thus disconnecting the tractor from the implement or vehicle. A shear pin or spring retainer may be placed across the recess 37 to prevent the chain falling out when not in use for weight transfer.

Instead of providing the notch 37, on the boom 18, a similar notch could be provided on the drawbar 13 in which case it would slope downwardly and forwardly.

Figure 8:
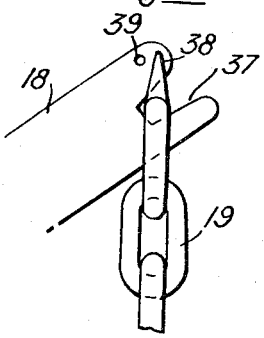
FIGS. 8 and 9 show further modifications.

In the modification shown in FIG. 8 an upstanding abutment part 38 is connected to the chain 19. If the chain exceeds a predetermined inclination to the vertical, the part 38 contacts a cooperating abutment in the form of a pin 39 carried on the boom 18 and the chain is forced out of the recess 37.

Figure 9:
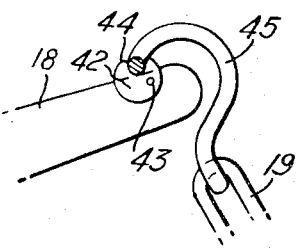

In the embodiment shown in FIG. 9 a cam 42 is pivoted on a pin 43 and includes a seating 44 which accommodates a specially shaped link 45 on the end of the chain 19. In normal use the link abuts the boom 18 and holds the cam in the position shown, but when the chain is pulled rearwards the link 45 pulls the cam overcenter and falls out of the seating 44.

It should be understood that the invention is not limited to the exact construction shown but that various equivalents and alterations in the construction and arrangement of parts, all falling within the scope and spirit of the invention, will be apparent to those skilled in the art.

We claim:

1. In a tractor having a rearwardly extending, vertically movable hitch link with hydraulic means for applying raising and lowering forces to the hitch link relative to the tractor, and a drawbar for connection with the tongue of a trailed vehicle; a rearwardly extending boom supported on the hitch link for side to side swinging movement relative to the tractor, and means for connecting the boom with the trailed vehicle tongue to apply a lifting force to the tongue and transfer a portion of the weight of the trailed vehicle to the tractor when the hydraulic means applies a raising force to the hitch link, and wherein the boom swings about an axis which is inclined upwardly and forwardly such that the free end of the boom moves downwardly as the boom moves out of parallel relationship with the longitudinal axis of the tractor to reduce the lifting force on the trailed vehicle tongue when the tractor and trailed vehicle are not in longitudinal alignment.

2. The construction defined in claim 1 wherein said connecting means comprises a flexible tension member having one end secured to the boom near its free end and its other end adapted to be connected to the trailed vehicle tongue.

3. The construction defined in claim 2 further including overload release means connecting said one end of said flexible tension member to the boom operable to disconnect the tension member from the boom upon disconnection of the vehicle tongue from the drawbar.

4. In a tractor having spaced draft links, a support mounted on the draft links, a rearwardly extending boom pivotally mounted on the support about an axis located in a fore and aft plane normal to the plane through the two draft links, and in which said support comprises a generally U-shaped yoke having a pair of parallel arms each of which is connected with one of the draft links and a base extending between said arms forwardly thereof with respect to the longitudinal axis of the tractor, and wherein said boom is mounted on an upright axis midway of the base of said U-shaped yoke.

5. The construction defined in claim 4 in which the axis of said boom is inclined rearwards from top to bottom.

6. The construction defined in claim 5 further including a flexible tension member having one end connected with the free end of the boom, the other end of which is adapted to be connected with the tongue of a towed vehicle, and overload release means for disconnecting the flexible tension member from the boom when the tension member assumes a predetermined angular relationship with the boom.

7. A tractor-trailer combination including a tractor having a pair of rearwardly extending, vertically movable draft links; power means on the tractor for applying forces tending to raise and lower the draft links relative to the tractor; a boom mounted on said pair of draft links for side to side swinging movement relative to the tractor longitudinal axis; a drawbar extending rearwardly from the tractor; a trailer having a forwardly projecting tongue pivotally connected with said drawbar; a tension member connecting the free end of said boom with said tongue to apply a lifting force to the tongue and transfer a portion of the trailer weight to the tractor when the hydraulic means applies a raising force to the draft links, and wherein the length of said tension member is such that the axis about which the boom swings is inclined upwardly and forwardly when the tension member exerts a lifting force on the implement tongue to cause the boom to swing downwardly toward the implement tongue and reduce the lifting force when the implement and tractor are out of longitudinal alignment with each other.

8. A tractor-trailer combination including a tractor having a pair of rearwardly extending, vertically movable draft links; power means on the tractor for applying forces tending to raise and lower the draft links relative to the tractor; a boom mounted on said pair of draft links for side to side swinging movement relative to the tractor longitudinal axis; a drawbar extending rearwardly from the tractor; a trailer having a forwardly projecting tongue pivotally connected with said drawbar; a tension member connecting the free end of said boom with said tongue to apply a lifting force to the tongue and transfer a portion of the trailer weight to the tractor when the hydraulic means applies a raising force to the draft links, and further including overload release means for said tension member operable to disconnect the tension member from the boom upon separation of the implement tongue from the drawbar.

9. The construction defined in claim 8 further including a socket in the outer end of the boom and wherein said overload release means includes a spring-urged bar housed in said socket and attached to one end of said flexible tension member.

10. The combination defined in claim 8 in which said overload release means comprises an upwardly opening recess in the outer end of said boom for slidably accommodating one end of said flexible tension member.

11. The combination defined in claim 8 in which said overload release means includes abutment means on said boom, a recess adjacent said abutment means for receiving one end of said tension member, and co-acting abutment means on flexible tension member operable to force the tension member out of said recess when the tension member exceeds a predetermined angular relationship with the boom.

12. The combination defined in claim 8 in which said overload release means includes an over-center cam connectable to said flexible tension member.

13. A tractor-trailer combination including a tractor having a pair of rearwardly extending, vertically movable draft links; power means on the tractor for applying forces tending to raise and lower the draft links relative to the tractor; a boom mounted on said pair of draft links for side to side swinging movement relative to the tractor longitudinal axis; a drawbar extending rearwardly from the tractor; a trailer having a forwardly projecting tongue pivotally connected with said drawbar; a tension member connecting the free end of said boom with said tongue to apply a lifting force to the tongue and transfer a portion of the trailer weight to the tractor when the hydraulic means applies a raising force to the draft links, and further including a yoke having a pair of rearwardly extending arms each secured to one of said draft links and a cross-piece extending between the forward ends of said arms, and wherein said boom has one end pivotally mounted on said cross-piece.

References Cited

UNITED STATES PATENTS

| 2,312,258 | 2/1943 | Martin | 280—405 X |
| 3,062,561 | 11/1962 | Wulff et al. | 280—405 |

LEO FRIAGLIA, *Primary Examiner.*